(12) United States Patent
Kaneko (10) Patent No.: US 10,122,029 B2
(45) Date of Patent: Nov. 6, 2018

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventor: Youhei Kaneko, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/749,313

(22) PCT Filed: Aug. 3, 2015

(86) PCT No.: PCT/JP2015/071951
§ 371 (c)(1),
(2) Date: Jan. 31, 2018

(87) PCT Pub. No.: WO2017/022053
PCT Pub. Date: Feb. 9, 2017

(65) Prior Publication Data
US 2018/0226666 A1   Aug. 9, 2018

(51) Int. Cl.
| | |
|---|---|
| *H01M 8/04089* | (2016.01) |
| *H01M 8/04111* | (2016.01) |
| *H01M 8/04828* | (2016.01) |
| *H01M 8/04955* | (2016.01) |
| *H01M 16/00* | (2006.01) |
| *H01M 8/04007* | (2016.01) |

(Continued)

(52) U.S. Cl.
CPC .... *H01M 8/04111* (2013.01); *H01M 8/04007* (2013.01); *H01M 8/04104* (2013.01); *H01M 8/04358* (2013.01); *H01M 8/04373* (2013.01); *H01M 8/04753* (2013.01); *H01M 8/04776* (2013.01); *H01M 8/04783* (2013.01); *H01M 8/04947* (2013.01); *H01M 8/04955* (2013.01); *H01M 16/006* (2013.01); *H01M 2250/20* (2013.01)

(58) Field of Classification Search
CPC ................ H01M 8/04753; H01M 8/04089
See application file for complete search history.

(56) References Cited

U.S. PATENT DOCUMENTS

| | | |
|---|---|---|
| 8,962,203 B2 | 2/2015 | Kirklin et al. |
| 8,993,184 B2 | 3/2015 | Kazuno et al. |

(Continued)

FOREIGN PATENT DOCUMENTS

| | | |
|---|---|---|
| CN | 101483247 A | 7/2009 |
| CN | 102655239 A | 9/2012 |

(Continued)

*Primary Examiner* — Olatunji A Godo
(74) *Attorney, Agent, or Firm* — Foley & Lardner LLP (57) ABSTRACT

The present invention includes a fuel cell mounted on a vehicle to generate electric power using oxidation gas and fuel gas being supplied thereto; an oil temperature sensor configured to detect oil temperature of a compressor; and a controller configured to control driving of the compressor, and also control pressure of the oxidation gas and pressure of the fuel gas being supplied to the fuel cell. The controller performs a control of decreasing rotational speed of the compressor when the oil temperature has exceeded an oil temperature threshold, and further performs a control of balancing the pressure of the oxidation gas and the pressure of the fuel gas. Therefore, it becomes possible to stably operate the fuel cell.

7 Claims, 10 Drawing Sheets (51) Int. Cl.
*H01M 8/0432* (2016.01)
*H01M 8/04746* (2016.01)

(56) References Cited

U.S. PATENT DOCUMENTS

| | | |
|---|---|---|
| 2009/0181267 A1 | 7/2009 | Kirklin et al. |
| 2012/0225329 A1 | 9/2012 | Kazuno et al. |
| 2012/0270126 A1 | 10/2012 | Matsumoto et al. |

FOREIGN PATENT DOCUMENTS

| | | |
|---|---|---|
| CN | 104110573 A | 10/2014 |
| JP | 2003-173807 A | 6/2003 |
| JP | 2005-235584 A | 9/2005 |
| JP | 2007-141566 A | 6/2007 |
| JP | 2008-112631 A | 5/2008 |
| JP | 2012-227044 A | 11/2012 |
| JP | 2014-89813 A | 5/2014 |

FUEL CELL SYSTEM AND METHOD FOR CONTROLLING FUEL CELL SYSTEM

TECHNICAL FIELD

The present invention relates to a fuel cell system and a method for controlling a fuel cell system.

BACKGROUND ART

When a vehicle having a fuel cell system mounted thereon is running across an area with low air density such as a highland, for example, the rotational speed of the compressor supplying a fuel cell with air (oxidation gas) is kept high even while the vehicle is idling during a temporary stop. Accordingly, there may be a rise of the temperature of oil for lubricating and cooling the bearing of the compressor and the gear, which may lead to occurrence of failure.

Patent Literature 1 describes limiting the operation of an oxidation gas supply means under a low-air-density environment. However, Patent Literature 1 is directed to controlling the upper limit of the rotational speed of the compressor to reduce noise when air pressure has decreased, and does not refer to failure that may occur in the system.

In addition, Patent Literature 2 describes controlling the hydrogen pressure to adjust the pressure of the fuel cell and also limiting the output of the compressor. However, Patent Literature 2 does not disclose measures to be taken when air pressure has decreased.

CITATION LIST

Patent Literature

Patent Literature 1: Japanese Patent Laid-Open Publication No. 2012-227044
Patent Literature 2: Japanese Patent Laid-Open Publication No. 2003-173807

SUMMARY OF INVENTION

Technical Problem

As has been described above, the conventional examples disclosed in Patent Literatures 1 and 2 do not completely overcome the problem that, when a vehicle having a fuel cell system mounted thereon is running across an area with low air density such as a highland, the rise of oil temperature of the compressor may cause system halt.

The present invention has been made in view of such conventional problems, and an object thereof is to provide a fuel cell system which is capable of suppressing the rise of oil temperature of the compressor so as to stably operate the fuel cell even when the system is used in an environment with low air density, and a method for controlling the fuel cell system.

Solution to Problem

The present invention includes a fuel cell mounted on a vehicle to generate electric power using oxidation gas and fuel gas being supplied thereto; an oil temperature detector configured to detect the oil temperature of a compressor; and a controller configured to control the driving of the compressor, and also control the pressure of the oxidation gas and the pressure of the fuel gas being supplied to the fuel cell. The controller performs a control of decreasing the rotational speed of the compressor when the oil temperature has exceeded an oil temperature threshold, and further performs a control of balancing the pressure of the oxidation gas and the pressure of the fuel gas.

Advantageous Effects of Invention

The present invention performs a control of decreasing the rotational speed of the compressor when the oil temperature of the compressor rises, and further performs a control of balancing the pressure of the oxidation gas and the pressure of the fuel gas after the rotational speed has decreased, whereby it becomes possible to suppress the rise of oil temperature of the compressor and stably operate the fuel cell.

DESCRIPTION OF EMBODIMENTS

Hereinafter, embodiments of the present invention will be described with reference to the drawings. The fuel cell system according to the present invention is mounted on a mobile body such as a vehicle, and causes electrochemical reaction between oxidation gas and fuel gas to generate electric power for driving the motor.

Explanation of First Embodiment

Figure 1:
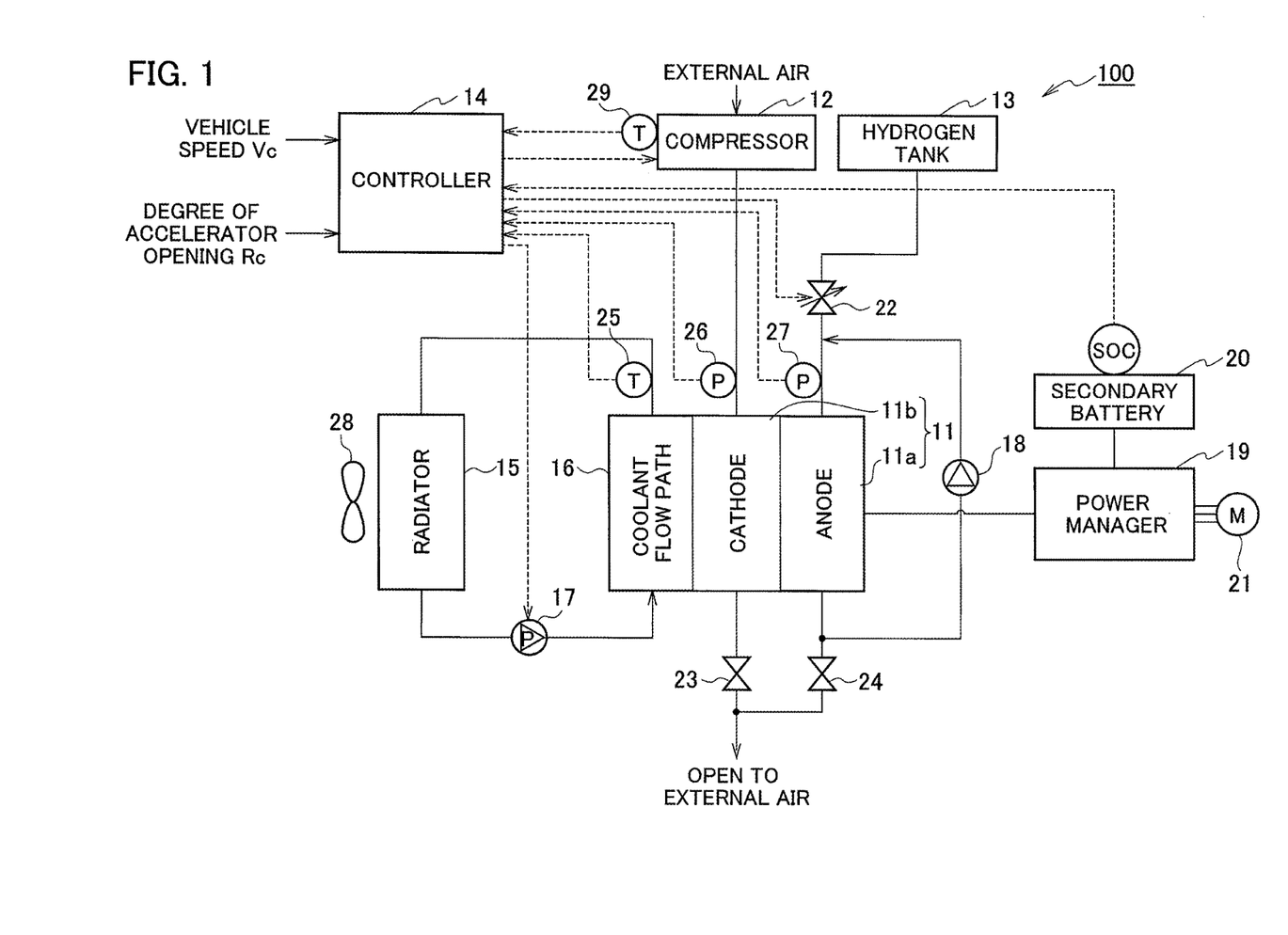
FIG. 1 is a block diagram illustrating a configuration of a fuel cell system according to an embodiment of the present invention.

FIG. 1 is a block diagram illustrating a configuration of a fuel cell system according to a first embodiment. As illustrated in FIG. 1, a fuel cell system 100 according to the first embodiment mainly includes a fuel cell 11, a coolant flow path 16, a controller 14, a compressor 12, a hydrogen tank 13, a radiator 15, a coolant pump 17, and a hydrogen circulation pump 18.

The fuel cell 11, having an anode 11a and a cathode 11b, generates electric power by chemical reaction between air (oxidation gas) being supplied to the anode 11a and hydrogen (fuel gas) being supplied to the cathode 11b. In addition, the fuel cell 11 is connected to a power manager 19.

The power manager 19 supplies electric power output from the fuel cell 11 to a motor 21. In addition, the power manager 19 performs a control of charging of a secondary battery 20 or supplying electric power output from the secondary battery 20 to the motor 21.

The secondary battery 20, which is intended to charge a surplus portion of the electric power generated by the fuel cell 11, outputs information on SOC indicating the amount of charge of the secondary battery 20 (ratio of amount of charge against full charge) to the controller 14.

The inlet-side flow path of the anode 11a is connected to the hydrogen tank 13 via a hydrogen supply valve 22. The outlet-side flow path 2 is branched into two courses: the fluid flowing through the first branch path is returned to the inlet-side flow path by the hydrogen circulation pump 18, whereas the second branch path is open to external air via a purge valve 24. There is provided an anode pressure sensor 27 configured to detect internal pressure of the anode 11a on a suitable position of the inlet-side flow path of the anode 11a. In other words, the anode pressure sensor 27 detects the pressure of hydrogen (fuel gas) being supplied from the hydrogen tank 13. The hydrogen supply valve 22 and the anode pressure sensor 27 are connected to the controller 14.

The hydrogen supply valve 22, whose degree of opening being under control of the controller 14, adjusts the amount of hydrogen being supplied to the anode 11a.

The inlet-side flow path of the cathode 11b is connected to the compressor 12, whereas the outlet-side flow path is open to external air via an air pressure adjustment valve 23. In addition, there is provided a cathode pressure sensor 26 for detecting pressure inside the cathode 11b on a suitable position of the inlet-side flow path. In other words, the cathode pressure sensor 26 detects the pressure of air (oxidation gas) being output from the compressor 12. The cathode pressure sensor 26 is connected to the controller 14, and information on the detected pressure is output to the controller 14.

The compressor 12 pressurizes air (oxidation gas) and supplies it to the cathode 11b. The compressor 12 is connected to the controller 14, and the controller 14 controls driving, stopping, and the rotational speed when driving. In addition, there is provided an oil temperature sensor 29 (oil temperature detector) configured to measure the oil temperature (denoted "Tc") for cooling and lubricating the driving mechanism of the compressor 12. An oil temperature Tc detected by the oil temperature sensor 29 is output to the controller 14.

The coolant flow path 16 cools the fuel cell 11 by circulating the coolant. The outlet-side of the coolant flow path 16 is connected to the radiator 15, and further connected to the inlet-side of the coolant flow path 16 via the coolant pump 17. Therefore, the coolant discharged from the coolant pump 17 flows inside the coolant flow path 16 to cool the fuel cell 11, and subsequently is cooled in the radiator 15 and returned to the coolant flow path 16 again.

There is provided a coolant temperature sensor 25 (coolant temperature detector) configured to detect the temperature of the coolant on a suitable position at the outlet-side of the coolant flow path 16. Information on the coolant temperature (denoted "Tout") detected by the coolant temperature sensor 25 is output to the controller 14. In addition, the radiator 15 has provided thereto a radiator fan 28 for cooling.

The controller 14 controls the fuel cell system 100 as a whole. Specifically, the controller 14 performs a control of decreasing the rotational speed of the compressor 12 when an oil temperature Tc detected by the oil temperature sensor 29 provided in the compressor 12 has risen and reached a preliminarily set oil temperature threshold T1. Furthermore, the controller 14 controls the amounts of hydrogen and coolant being supplied so that the pressure of the anode 11a and the amount of coolant flowing through the coolant flow path 16 balance with the pressure of the cathode 11b when the pressure of the cathode 11b has decreased by decreasing the rotational speed of the compressor 12. Furthermore, the controller 14 obtains a coolant temperature Tout detected by the coolant temperature sensor 25 and performs a control of raising the rotational speed of the compressor 12, when the coolant temperature Tout has exceeded a preliminarily set coolant temperature threshold T2.

Note that the controller 14 can be configured as an integrated type computer including for example a central processing unit (CPU), and a storage device such as a RAM, a ROM, or a hard disk.

Figure 2:
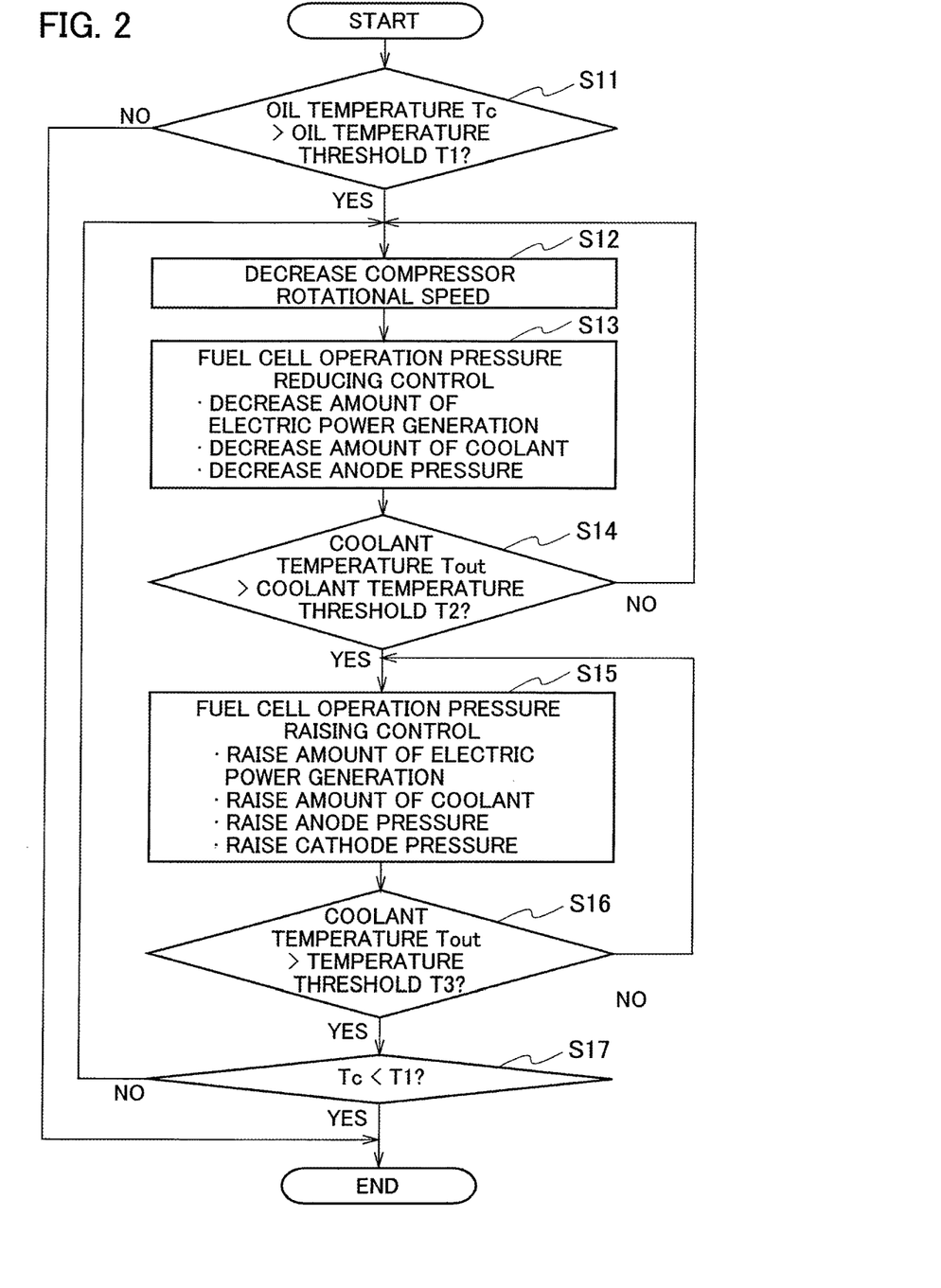
FIG. 2 is a flowchart illustrating a processing procedure of a fuel cell system according to a first embodiment of the present invention.

Next, an operation of the fuel cell system 100 configured as described above according to the first embodiment will be described with reference to the flowchart illustrated in FIG. 2 and the timing chart illustrated in FIG. 3. FIG. 2 is a flowchart illustrating rotational speed control of the compressor 12 performed by the controller 14 while, particularly, a vehicle is waiting for the traffic light to change, when the vehicle is running in an environment with low air density such as a highland.

Initially, the fuel cell 11 is supposed to be stably operating. In other words, the pressure of the anode 11a and the pressure of the cathode 11b are supposed to be the pressure during normal operation, and the temperature of the coolant is supposed to be the temperature during the normal operation.

At step S11 of FIG. 2, the controller 14 obtains the oil temperature Tc of the compressor 12 detected by the oil temperature sensor 29. The controller 14 then compares the oil temperature Tc with the oil temperature threshold T1 described above and determines whether or not the oil temperature Tc has exceeded the oil temperature threshold T1. In other words, the controller 14 determines whether or not "Tc>T1" holds. When "Tc>T1" does not hold (NO at step S11), the process is terminated. In other words, the controller 14 determines that there is no problem with continuing driving of the compressor 12 when the oil temperature Tc has not risen, and therefore does not perform the rotational speed control of the compressor 12.

When, on the other hand, "Tc>T1" holds (YES at step S11), the controller 14 performs a control of decreasing the rotational speed of the compressor 12 at step S12. In other words, when the ambient air density is low such as the case where the vehicle is running across a highland, for example, it is necessary to increase the rotational speed in order to supply a desired amount of air (oxidation gas) to the fuel cell 11. Accordingly, there may occur a rise of the oil temperature Tc of oil that cools and lubricates the rotational axis system of the compressor 12. Therefore, the controller 14 compares the oil temperature Tc with the oil temperature threshold T1 and, when "Tc>T1" holds, performs a process of decreasing the rotational speed of the compressor 12.

Figure 3:
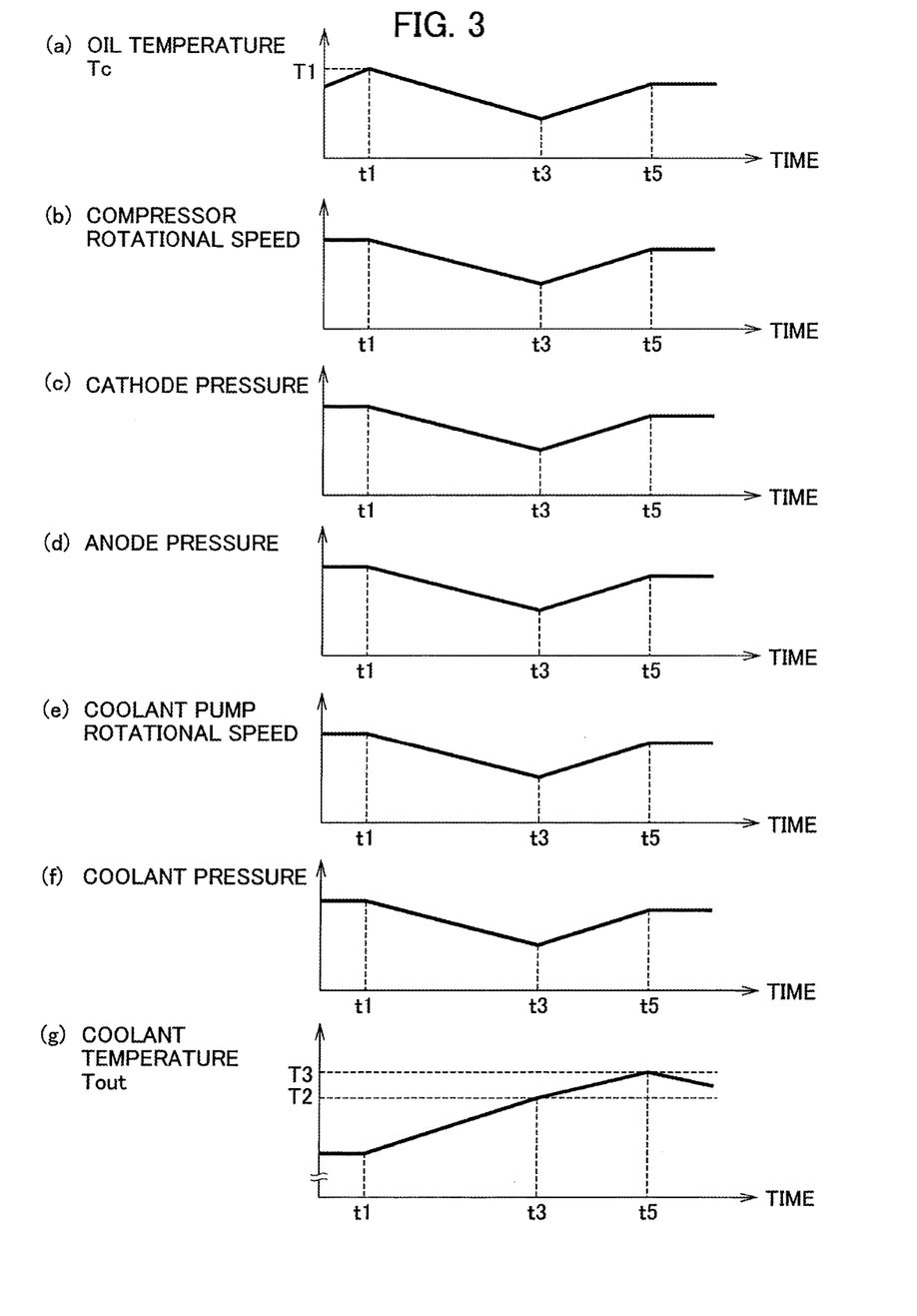
FIG. 3 is a timing chart illustrating oil temperature, compressor rotational speed, cathode pressure, anode pressure, rotational speed of coolant pump, coolant pressure, and temporal variation of coolant temperature of the fuel cell system according to the first embodiment of the present invention.

As a result, when the oil temperature Tc has risen and has reached "Tc>T1" at a time point t1 as illustrated in FIG. 3(a) while the vehicle is idling, for example, the controller 14 decreases the rotational speed of the compressor 12 as illustrated in FIG. 3(b).

At step S13, the controller 14 performs a control of reducing the operation pressure of the fuel cell 11 and decreasing the amount of electric power generation. In the process, the pressure of the cathode 11b (pressure of oxidation gas) decreases due to decreasing the rotational speed of the compressor 12, and therefore the controller 14 adjusts the anode pressure (pressure of fuel gas) so as to balance with the cathode pressure. Specifically, the controller 14 performs a control of decreasing the pressure of hydrogen being supplied to the anode 11a by narrowing the degree of opening of the hydrogen supply valve 22 illustrated in FIG. 1 so that the cathode pressure balances with the anode pressure. Furthermore, the controller 14 decreases the amount of coolant being supplied by the coolant pump 17.

As a result, the cathode pressure and the anode pressure decrease at the time point t1 as illustrated in FIGS. 3 (c) and 3(d), the rotational speed of the coolant pump 17 decreases at the time point t1 as illustrated in FIGS. 3(e) and 3(f), and the coolant pressure decreases in accordance therewith. In other words, the controller 14 (control unit) performs a control of decreasing the rotational speed of the compressor 12 when the oil temperature Tc has exceeded the oil temperature threshold T1, and further performs a control of balancing the pressure of oxidation gas (cathode pressure) and the pressure of fuel gas (anode pressure).

At step S14, the controller 14 compares the coolant temperature Tout detected by the coolant temperature sensor 25 with a preliminarily set coolant temperature threshold T2. In other words, the controller 14 determines whether or not "Tout>T2" holds. Subsequently, when "Tout>T2" does not hold (NO at step S14), the process flow returns to step S12. In addition, when the coolant temperature has risen and "Tout>T2" holds (YES at step S14), the controller 14 performs a control of raising the operation pressure of the fuel cell 11 at step S15 to raise the amount of electric power generation, in order to prevent the temperature of the fuel cell 11 from entering an overheated state. Specifically, the controller 14 raises the rotational speed of the compressor 12 and raises the cathode pressure. Furthermore, the controller 14 widens the degree of opening of the hydrogen supply valve 22 and raises the anode pressure so as to balance the anode pressure with the rise of the cathode pressure. In addition, the controller 14 increases the amount of coolant being supplied to the coolant flow path 16 by raising the output of the coolant pump 17.

In other words, when the coolant temperature Tout has started rising at the time point t1 and reached the coolant temperature threshold T2 at a time point t3 as illustrated in FIG. 3(g), the controller 14 raises the rotational speed of the compressor 12 as illustrated in FIG. 3(b). In accordance therewith, the oil temperature Tc turns to a rising trend as illustrated in FIG. 3(a). In addition, the cathode pressure turns to a rising trend as illustrated in FIG. 3(c), and the anode pressure and the coolant pressure are controlled so as to balance with the variation of pressure. Therefore, the anode pressure turns from a decreasing to an increasing trend at the time point t3 as illustrated in FIG. 3(d), and the coolant pump rotational speed turns from a decreasing to an increasing trend at the time point t3 as illustrated in FIG. 3(e). Furthermore, the coolant pressure turns from a decreasing to an increasing trend at the time point t3 as illustrated in FIG. 3(f). In addition, as illustrated in FIG. 3(g), the rise rate (gradient) of the coolant temperature Tout decreases at the time point t3.

At step S16, the controller 14 determines whether or not the coolant temperature Tout has exceeded a preliminarily set temperature threshold T3 (here, T3>T2). In other words, it is determined whether or not "Tout>T3" holds. When "Tout>T3" does not hold (NO at step S16), the process flow returns to step S15, whereas the process flow proceeds to step S17 when "Tout>T3" holds (YES at step S16).

At step S17, the controller 14 determines whether or not the oil temperature Tc of the compressor 12 has fallen below the oil temperature threshold T1. Then, when it is determined that "Tc<T1" does not hold (NO at step S17), the process flow returns to step S12. In other words, the process of decreasing the rotational speed of the compressor 12 is repeated. When, on the other hand, "Tc<T1" holds (YES at step S17), the process is terminated. In this manner, a process of decreasing the rotational speed of the compressor 12 and also balancing the pressure of the fuel cell 11 is performed, when the oil temperature Tc has risen. Subsequently, a process of raising the rotational speed of the compressor 12 and also balancing the pressure of the fuel cell 11 is performed, when the coolant temperature has risen. Repeating the aforementioned two processes thus allows for a stable and seamless operation of the fuel cell system 100.

As thus described, the fuel cell system 100 according to the first embodiment detects the oil temperature Tc of the compressor 12 and, when the oil temperature Tc has risen to the oil temperature threshold T1, decreases the rotational speed of the compressor 12. Accordingly, the oil temperature Tc can be decreased, whereby it is possible to prevent the compressor from entering an overheated state and consequently prevent the compressor 12 from failing.

In addition, decreasing the rotational speed of the compressor 12 causes the cathode pressure to decrease. On this occasion, the controller 14 decreases the anode pressure and the amount of coolant flow so as to balance with the decreasing cathode pressure. Therefore, it is possible to stably operate the fuel cell 11 even when the rotational speed of the compressor 12 is decreased. Accordingly, a seamless operation is possible without terminating the fuel cell 11. In addition, decreasing the rotational speed of the compressor 12 allows for reducing noise, as well as reducing power consumption. Furthermore, it is possible to reduce consumption of hydrogen.

Furthermore, when the coolant temperature Tout has risen and reached the coolant temperature threshold T2, the controller 14 increases the rotational speed of the compressor 12. On this occasion, the cathode pressure rises. The controller 14 increases the anode pressure and the amount of coolant to balance with the rising cathode pressure. Therefore, it is possible to prevent the fuel cell 11 from entering an overheated state so as to stably operate the fuel cell 11 even when the rotational speed of the compressor 12 has turned to an increasing trend.

In addition, since the oil temperature threshold T1 and the coolant temperature threshold T2 can be set to a desired temperature, there may be set a temperature condition that does not affect the running of the vehicle.

Explanation of Second Embodiment

Next, a second embodiment of the present invention will be described. The system configuration is similar to that of FIG. 1 described above and therefore explanation thereof will be omitted. Hereinafter, a processing procedure of the fuel cell system 100 according to the second embodiment will be described with reference to the flowchart illustrated in FIG. 4 and the timing chart illustrated in FIG. 5.

Similarly to the first embodiment, initially, the fuel cell 11 is supposed to be stably operating. In other words, the pressure of the anode 11a and the pressure of the cathode 11b are supposed to be the pressure during normal operation, and the temperature of the coolant is supposed to be the temperature during the normal operation.

Figure 4:
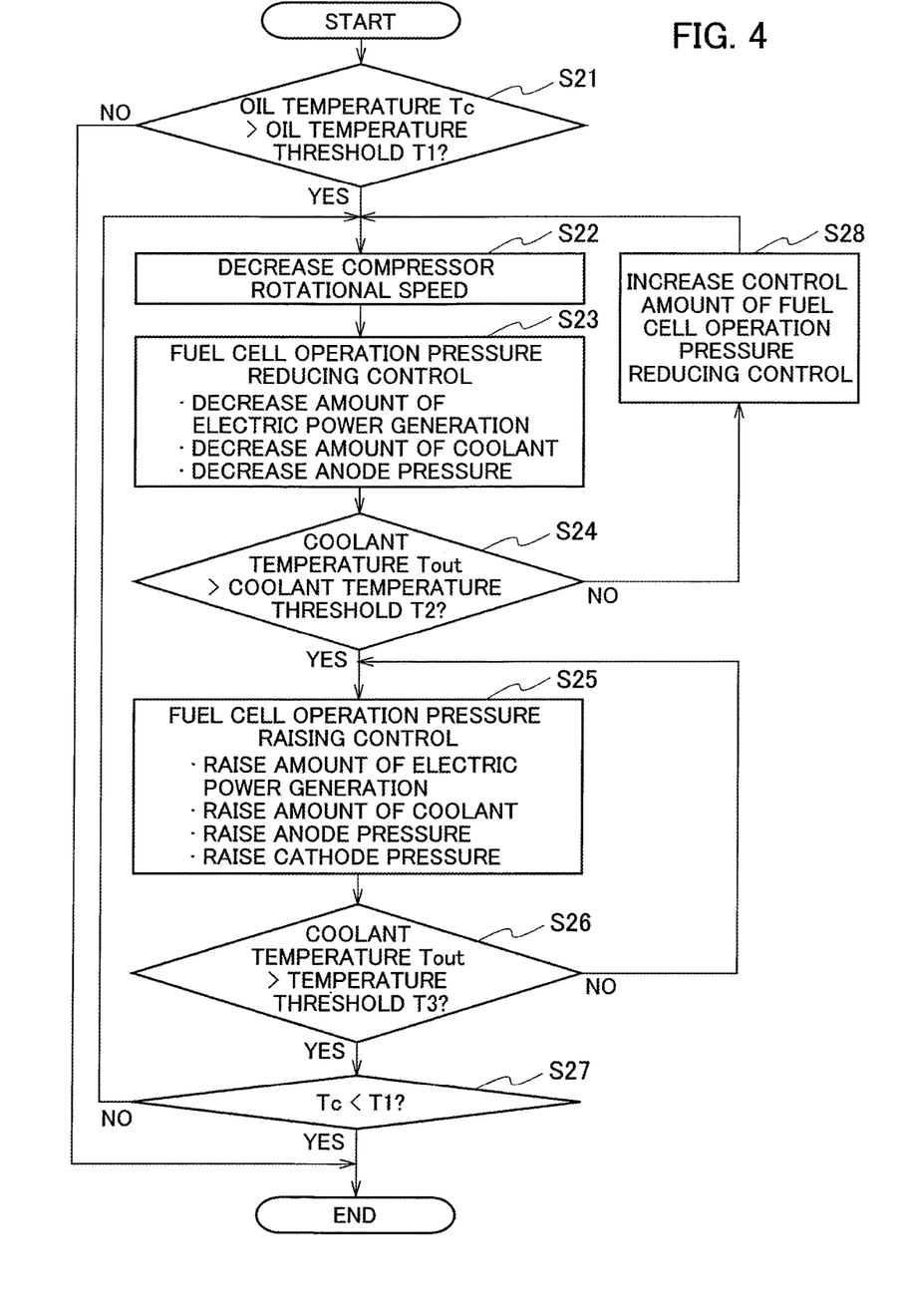
FIG. 4 is a flowchart illustrating a processing procedure of a fuel cell system according to a second embodiment of the present invention.

At step S21 of FIG. 4, the controller 14 obtains the oil temperature Tc of the compressor 12 detected by the oil temperature sensor 29. The controller 14 then compares the oil temperature Tc with the oil temperature threshold T1, and determines whether or not the oil temperature Tc has exceeded the oil temperature threshold T1. In other words, the controller 14 determines whether or not "Tc>T1" holds. When "Tc>T1" does not hold (NO at step S21), the process is terminated. In other words, the controller 14 determines that there is no problem with continuing the driving of the compressor 12 when the oil temperature Tc has not risen, and therefore does not perform the rotational speed control of the compressor 12.

When, on the other hand, "Tc>T1" holds (YES at step S21), the controller 14 performs a control of decreasing the rotational speed of the compressor 12 at step S22. As a result, when the oil temperature Tc keeps rising while the vehicle is idling and has reached "Tc>T1" at the time point t1 as illustrated in FIG. 5(a), for example, the controller 14 decreases the rotational speed of the compressor 12 as illustrated in FIG. 5(b).

At step S23, the controller 14 performs a control of reducing the operation pressure of the fuel cell 11. In the process, the pressure of the cathode 11b decreases due to decreasing the rotational speed of the compressor 12, and therefore the controller 14 adjusts the anode pressure so as to balance with the cathode pressure. Specifically, the controller 14 performs a control of decreasing the pressure of hydrogen being supplied to the anode 11a by narrowing the degree of opening of the hydrogen supply valve 22 so that the anode pressure balances with the cathode pressure. Furthermore, the controller 14 decreases the amount of coolant being supplied by the coolant pump 17.

Figure 5:
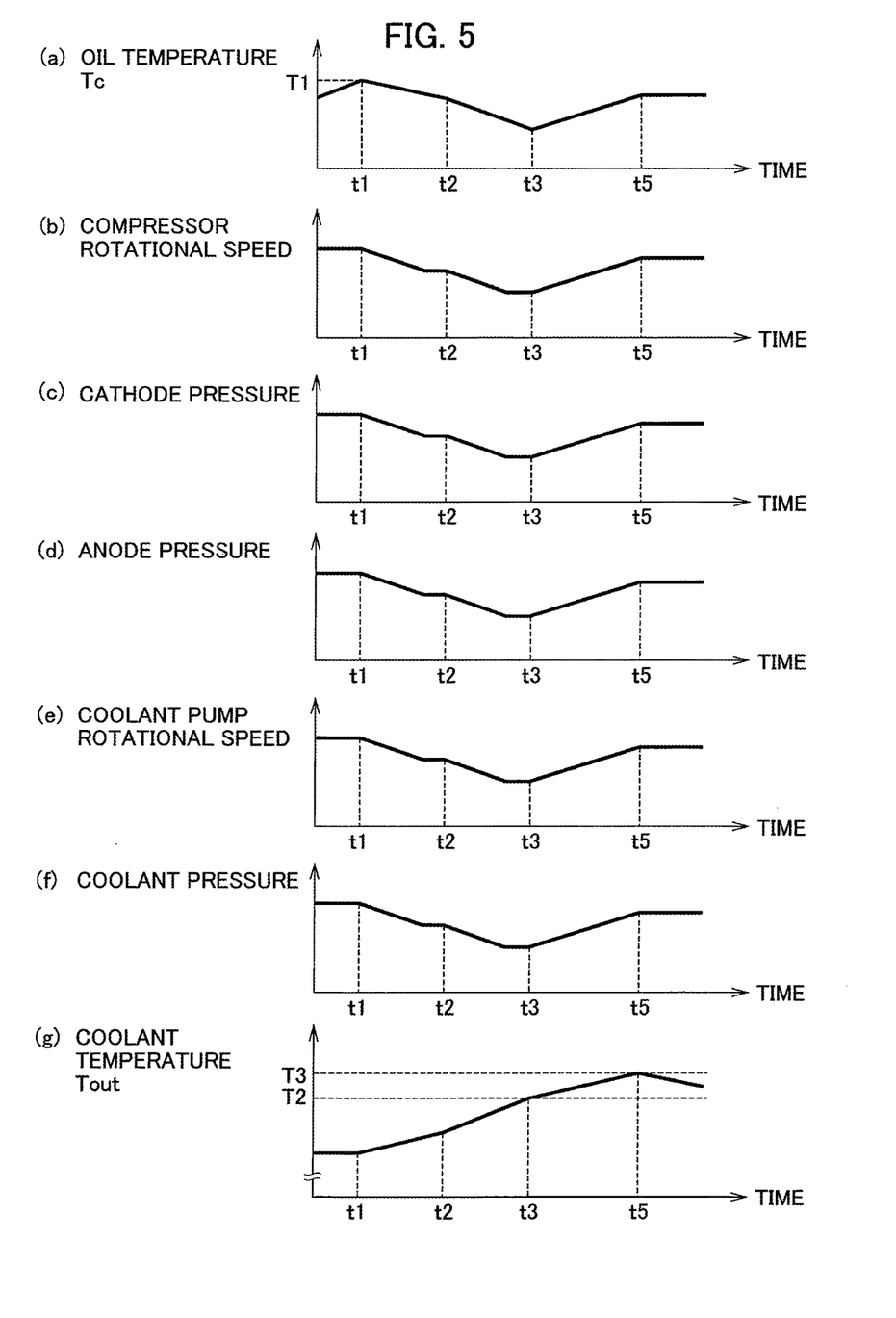
FIG. 5 is a timing chart illustrating oil temperature, compressor rotational speed, cathode pressure, anode pressure, rotational speed of coolant pump, coolant pressure, and temporal variation of coolant temperature of the fuel cell system according to the second embodiment of the present invention.

As a result, the cathode pressure and the anode pressure decrease at the time point t1 as illustrated in FIGS. 5(c) and 5(d), the rotational speed of the coolant pump 17 decreases at the time point t1 as illustrated in FIGS. 5(e) and 5(f), and the coolant pressure decreases in accordance therewith.

At step S24, the controller 14 compares the coolant temperature Tout detected by the coolant temperature sensor 25 with the coolant temperature threshold T2. Subsequently, when "Tout>T2" does not hold (NO at step S24), the controller 14 performs a process of increasing the control amount of the operation pressure decreasing control of the fuel cell 11 at step S28. Specifically, the controller 14 performs a process of further decreasing the rotational speed of the compressor 12. As a result, the rotational speed of the compressor 12 further decreases as illustrated at a time point t2 of FIG. 5(b). In accordance therewith, the cathode pressure, the anode pressure, the rotational speed of the coolant pump 17, and the coolant pressure decrease as illustrated in FIGS. 5(c) to 5(f). In addition, as illustrated in FIG. 5(g), the rise rate of the coolant temperature slightly rises at the time point t2. Subsequently, the process flow returns to step S22.

When the coolant temperature has risen and "Tout>T2" holds (YES at step S24), the controller 14 performs a control of raising the operation pressure of the fuel cell 11 and the amount of electric power generation at step S25. Specifically, the controller 14 raises the rotational speed of the compressor 12 and raises the cathode pressure. Furthermore, the controller 14 widens the degree of opening of the hydrogen supply valve 22 and raises the anode pressure so as to balance the anode pressure with the rise of the cathode pressure. In addition, the controller 14 increases the amount of coolant being supplied to the coolant flow path 16 by raising the output of the coolant pump 17.

In other words, when the coolant temperature Tout has started rising at the time point t1 and reached the coolant temperature threshold T2 at the time point t3 as illustrated in FIG. 5(g), the controller 14 raises the rotational speed of the compressor 12 as illustrated in FIG. 5(b). In accordance therewith, the oil temperature Tc turns to a rising trend as illustrated in FIG. 5(a). In addition, the cathode pressure turns to a rising trend as illustrated in FIG. 5(c), and the anode pressure and coolant pressure are controlled so as to balance with the variation of pressure. Therefore, the anode pressure turns from a decreasing to an increasing trend at the time point t3 as illustrated in FIG. 5(d), and the coolant pump rotational speed turns from a decreasing to an increasing trend at the time point t3 as illustrated in FIG. 5(e). Furthermore, the coolant pressure turns from a decreasing to an increasing trend at the time point t3 as illustrated in FIG. 5(f). In addition, as illustrated in FIG. 5(g), the rise rate (gradient) of the coolant temperature Tout decreases.

At step S26, the controller 14 determines whether or not the coolant temperature Tout has exceeded the temperature threshold T3. In other words, it is determined whether or not "Tout>T3" holds. When "Tout>T3" does not hold (NO at step S26), the process flow returns to step S25, whereas the process flow proceeds to step S27 when "Tout>T3" holds (YES at step S26).

At step S27, the controller 14 determines whether or not the oil temperature Tc of the compressor 12 has fallen below the oil temperature threshold T1. Then, when it is determined that "Tc<T1" does not hold (NO at step S27), the process flow returns to step S22. In other words, the process of decreasing the rotational speed of the compressor 12 is repeated. When, on the other hand, "Tc<T1" holds (YES at step S27), the process is terminated.

As thus described, the fuel cell system 100 according to the second embodiment detects the oil temperature Tc of the compressor 12 and, when the oil temperature Tc has reached the oil temperature threshold T1, decreases the rotational speed of the compressor 12. When, on this occasion, the coolant temperature Tout does not decrease to the coolant temperature threshold T2, the control amount of the operation pressure decreasing control of the fuel cell 11 is gradually increased by performing the process of step S28 of FIG. 4. Accordingly, the rotational speed of the compressor 12 can be decreased with a good responsiveness, thereby preventing the compressor 12 from failing.

In addition, decreasing the rotational speed of the compressor 12 causes the cathode pressure to decrease. On this occasion, the controller 14 decreases the anode pressure and the amount of coolant flow so as to balance with the decreasing cathode pressure. Therefore, it is possible to stably operate the fuel cell 11 even when the rotational speed of the compressor 12 is decreased. In addition, decreasing the rotational speed of the compressor 12 allows for reducing noise.

Furthermore, when the coolant temperature Tout has risen and reached the coolant temperature threshold T2, the rotational speed of the compressor 12 is increased. On this occasion, the cathode pressure rises. The controller 14 increases the anode pressure and the amount of coolant flow to balance with the rising cathode pressure. Therefore, it is possible to stably operate the fuel cell 11 even when the rotational speed of the compressor 12 has turned to an increasing trend.

Explanation of Third Embodiment

Next, a third embodiment of the present invention will be described. The system configuration is similar to that of FIG. 1 described above and therefore explanation thereof will be omitted. Hereinafter, a processing procedure of the fuel cell system 100 according to the third embodiment will be described with reference to the flowchart illustrated in FIG. 6 and the timing chart illustrated in FIG. 7.

Similarly to the first and the second embodiments, initially, the fuel cell 11 is supposed to be stably operating. In other words, the pressure of the anode 11a and the pressure of the cathode 11b are supposed to be the pressure during normal operation, and the temperature of the coolant is supposed to be the temperature during the normal operation.

Figure 6:
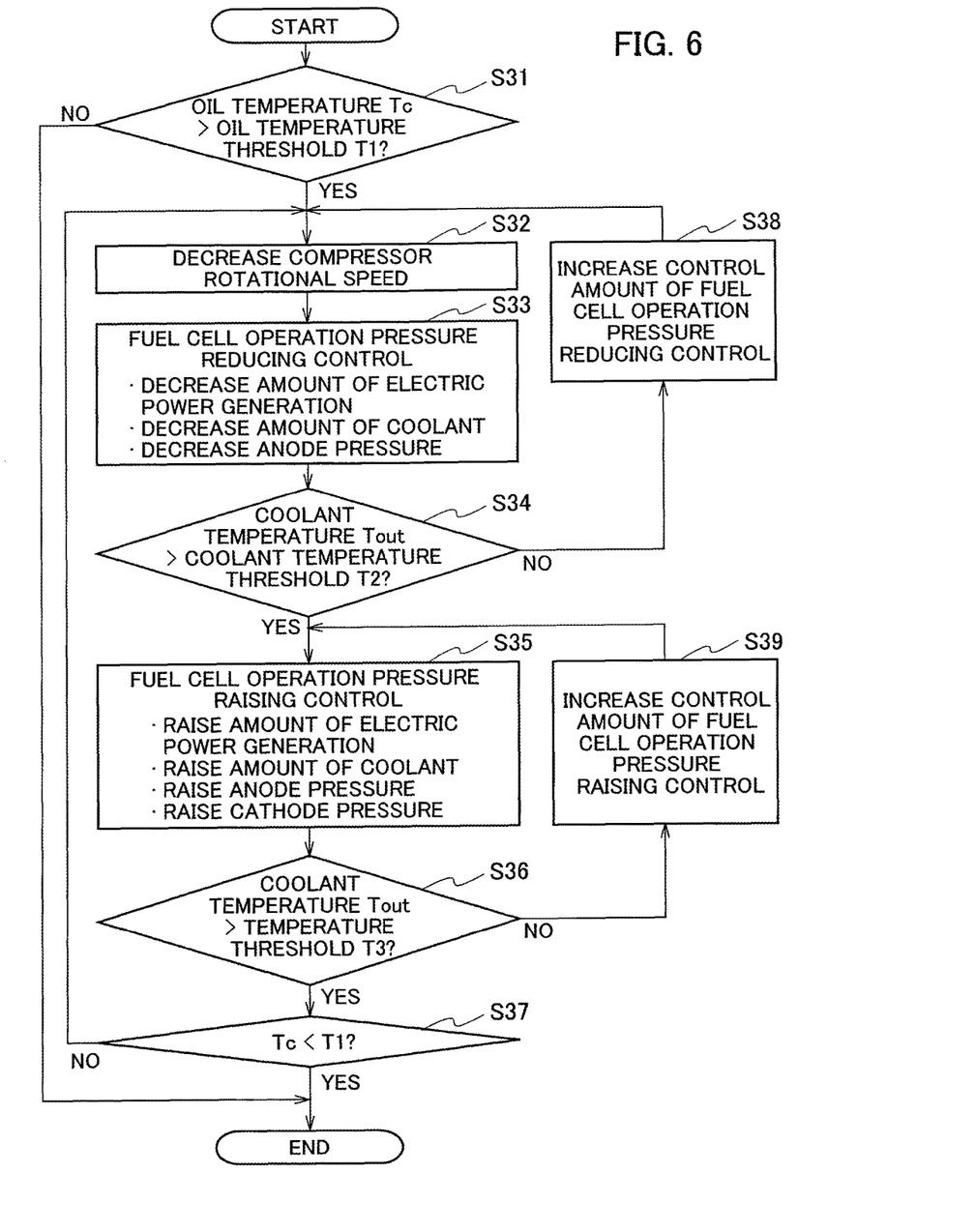
FIG. 6 is a flowchart illustrating a processing procedure of a fuel cell system according to a third embodiment of the present invention.

At step S31 of FIG. 6, the controller 14 obtains the oil temperature Tc of the compressor 12 detected by the oil temperature sensor 29. The controller 14 then compares the oil temperature Tc with the oil temperature threshold T1, and determines whether or not the oil temperature Tc has exceeded the oil temperature threshold T1. In other words, the controller 14 determines whether or not "Tc>T1" holds. When "Tc>T1" does not hold (NO at step S31), the process is terminated. In other words, the controller 14 determines that there is no problem with continuing the driving of the compressor 12 when the oil temperature Tc has not risen, and therefore does not perform the rotational speed control of the compressor 12.

When, on the other hand, "Tc>T1" holds (YES at step S31), the controller 14 performs a control of decreasing the rotational speed of the compressor 12 at step S32. As a result, when the oil temperature Tc keeps rising while the vehicle is idling and has reached "Tc>T1" at the time point t1 as illustrated in FIG. 7(a), for example, the controller 14 decreases the rotational speed of the compressor 12 as illustrated in FIG. 7(b).

At step S33, the controller 14 performs a control of reducing the operation pressure of the fuel cell 11 and decreasing the amount of electric power generation. In the process, the pressure of the cathode 11b decreases due to decreasing the rotational speed of the compressor 12, and therefore the controller 14 adjusts the anode pressure so as to balance with the cathode pressure. Specifically, the controller 14 performs a control of decreasing the pressure of hydrogen being supplied to the anode 11a by narrowing the degree of opening of the hydrogen supply valve 22 so that the cathode pressure balances with the anode pressure. Furthermore, the controller 14 decreases the amount of coolant being supplied by the coolant pump 17.

Figure 7:
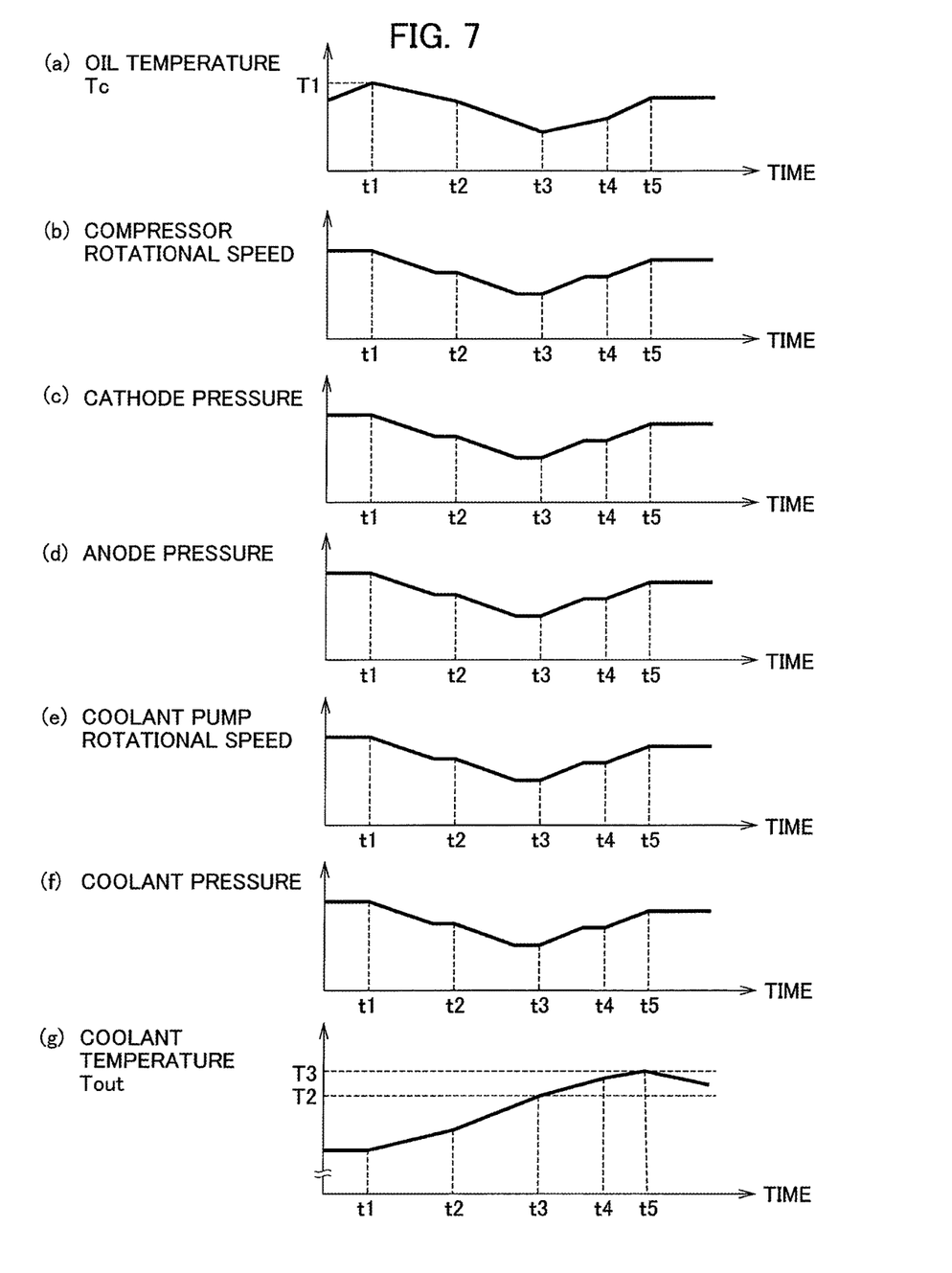
FIG. 7 is a timing chart illustrating oil temperature, compressor rotational speed, cathode pressure, anode pressure, rotational speed of coolant pump, coolant pressure, and temporal variation of coolant temperature of the fuel cell system according to the third embodiment of the present invention.

As a result, the cathode pressure and the anode pressure decrease at the time point t1 as illustrated in FIGS. 7(c) and 7(d), the rotational speed of the coolant pump 17 decreases the time point t1 as illustrated in FIGS. 7(e) and 7(f), and the coolant pressure decreases in accordance therewith.

At step S34, the controller 14 compares the coolant temperature Tout detected by the coolant temperature sensor 25 with the coolant temperature threshold T2. In other words, the controller 14 determines whether or not "Tout>T2" holds. Subsequently, when "Tout>T2" does not hold (NO at step S34), the controller 14 performs a process of increasing the control amount of the operation pressure decreasing control of the fuel cell 11 at step S38. Specifically, the controller 14 performs a process of further decreasing the rotational speed of the compressor 12. As a result, the rotational speed of the compressor 12 further decreases as illustrated at the time point t2 of FIG. 7(b). In accordance therewith, the cathode pressure, the anode pressure, the rotational speed of the coolant pump 17, and the coolant pressure decrease as illustrated in FIGS. 7 (c) to 7(f). In addition, as illustrated in FIG. 7(g), the rise rate of the coolant temperature slightly rises at the time point t2. Subsequently, the process flow returns to step S32.

When the coolant temperature has risen and "Tout>T2" holds (YES at step S34), the controller 14 performs a control of raising the operation pressure of the fuel cell 11 and raising the amount of electric power generation at step S35. Specifically, the controller 14 raises the rotational speed of the compressor 12 and raises the cathode pressure. Furthermore, the controller 14 widens the degree of opening of the hydrogen supply valve 22 and raises the anode pressure so as to balance the anode pressure with the rise of cathode pressure. In addition, the controller 14 increases the amount of coolant being supplied to the coolant flow path 16 by raising the output of the coolant pump 17. The controller 14 then raises the amount of electric power generation.

In other words, when the coolant temperature Tout has started rising at the time point t1 and reached the coolant temperature threshold T2 at the time point t3 as illustrated in FIG. 7(g), the controller 14 raises the rotational speed of the compressor 12 as illustrated in FIG. 7(b). In accordance therewith, the oil temperature Tc turns to a rising trend as illustrated in FIG. 7(a). In addition, the cathode pressure turns to a rising trend as illustrated in FIG. 7(c), and the anode pressure and coolant pressure are controlled so as to balance with the variation of pressure. Therefore, anode pressure turns from a decreasing to an increasing trend at the time point t3 as illustrated in FIG. 7(d), and the coolant pump rotational speed turns from a decreasing to an increasing trend at the time point t3 as illustrated in FIG. 7(e). Furthermore, coolant pressure turns from a decreasing to an increasing trend at the time point t3 as illustrated in FIG. 7(f). In addition, as illustrated in FIG. 7(g), the rise rate (gradient) of the coolant temperature Tout decreases at the time point t3.

At step S36, the controller 14 determines whether or not the coolant temperature Tout has exceeded the temperature threshold T3. In other words, it is determined whether or not "Tout>T3" holds. When "Tout>T3" does not hold (NO at step S36), the controller 14 performs a process of increasing the control amount of the operation pressure raising control of the fuel cell 11 at step S39. Specifically, the controller 14 performs a process of further raising the rotational speed of the compressor 12. As a result, the rotational speed of the compressor 12 further rises at a time point t4 of FIG. 7(b). In accordance therewith, the cathode pressure, the anode pressure, the rotational speed of the coolant pump 17, and the coolant pressure rise as illustrated in FIGS. 7(c) to 7(f). In addition, as illustrated in FIG. 7(g), the rise rate of the coolant temperature slightly decreases at the time point t4. Subsequently, the process flow returns to step S35.

When it is determined that the coolant temperature has risen and "Tout>T3" holds (YES at step S36), the controller 14 determines, at step S37, whether or not the oil temperature Tc of the compressor 12 has fallen below the oil temperature threshold T1. Then, when it is determined that "Tc<T1" does not hold (NO at step S37), the process flow returns to step S32. When, on the other hand, "Tc<T1" holds (YES at step S37), the process is terminated.

As thus described, the fuel cell system 100 according to the third embodiment detects the oil temperature Tc of the compressor 12 and, when the oil temperature Tc has reached the oil temperature threshold T1, decreases the rotational speed of the compressor 12. When, on this occasion, the coolant temperature Tout does not decrease to the coolant temperature threshold T2, the control amount of the operation pressure decreasing control of the fuel cell 11 is gradually increased by performing the process of step S38 of FIG. 6. Accordingly, the rotational speed of the compressor 12 can be decreased with a good responsiveness, thereby preventing the compressor 12 from failing.

In addition, decreasing the rotational speed of the compressor 12 causes the cathode pressure to decrease. On this occasion, the controller 14 reduces the anode pressure and the amount of coolant so as to balance with the decreasing cathode pressure. Therefore, it is possible to stably operate the fuel cell 11 even when the rotational speed of the compressor 12 is decreased. In addition, decreasing the rotational speed of the compressor 12 allows for reducing noise.

Furthermore, when the coolant temperature Tout has risen and reached the coolant temperature threshold T2, the rotational speed of the compressor 12 is increased. On this occasion, when the coolant temperature Tout does not rise to the temperature threshold T3, the control amount of pressure raising control of the fuel cell 11 is gradually increased by performing the process of step S39 of FIG. 6. Accordingly, the amount of coolant can be increased with a good responsiveness, thereby preventing the fuel cell 11 from entering an overheated state.

In addition, raising the rotational speed of the compressor 12 causes the cathode pressure to rise. The controller 14 increases the anode pressure and the amount of coolant to balance with the rising cathode pressure. Therefore, it is possible to stably operate the fuel cell 11 even when the rotational speed of the compressor 12 has turned to an increasing trend.

Explanation of Fourth Embodiment

Next, a fourth embodiment of the present invention will be described. The system configuration is similar to that of FIG. 1 described above and therefore explanation thereof will be omitted. Hereinafter, a processing procedure of the fuel cell system 100 according to the fourth embodiment will be described with reference to the flowchart illustrated in FIG. 8.

Figure 8:
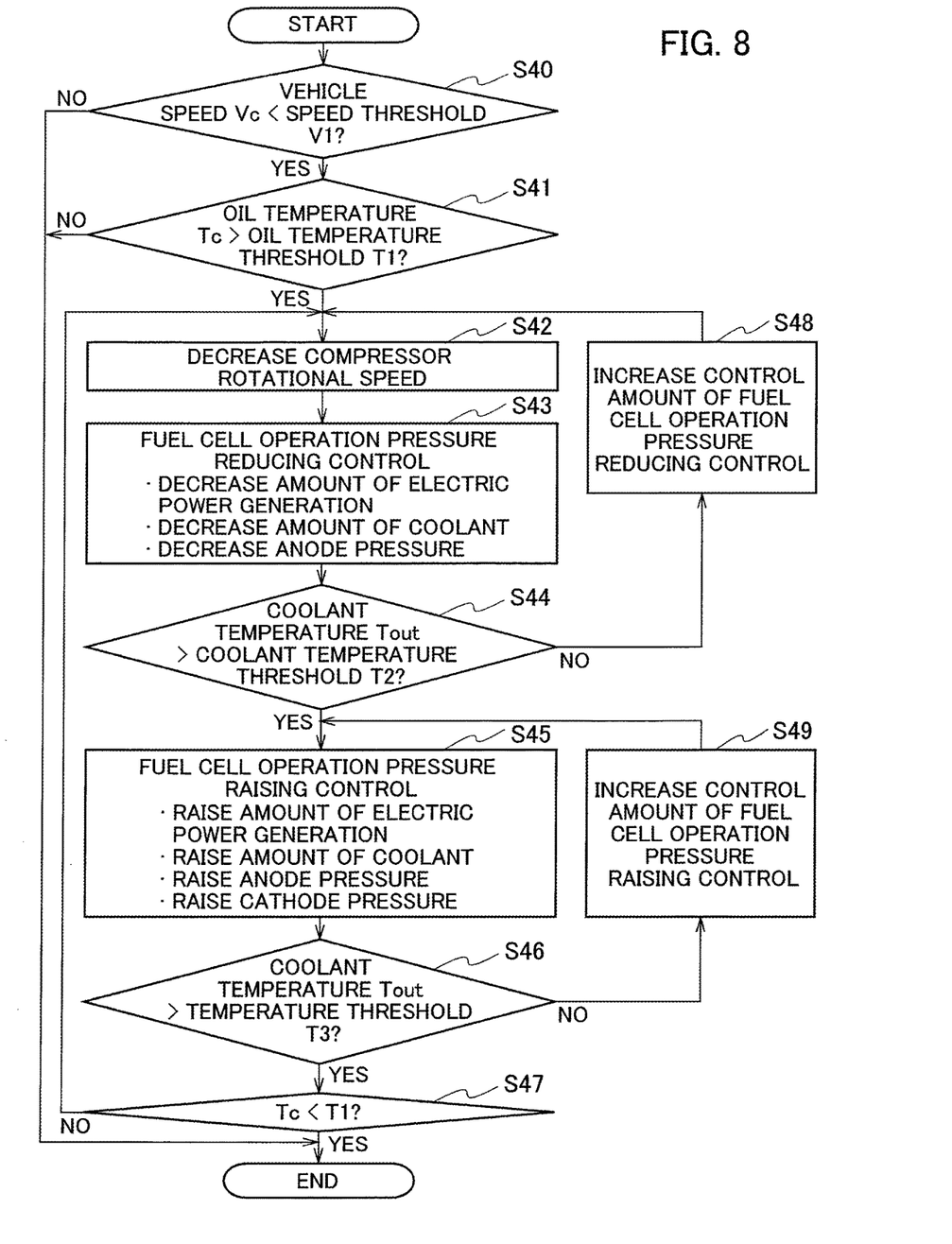
FIG. 8 is a flowchart illustrating a processing procedure of a fuel cell system according to a fourth embodiment of the present invention.

At step S40, the controller 14 obtains a vehicle speed Vc which is the running speed of the vehicle, and compares the vehicle speed Vc with a preliminarily set speed threshold V1. Subsequently, the process flow proceeds to step S41 when the vehicle speed Vc is lower than the speed threshold V1, or the process is terminated when the vehicle speed Vc is equal to or higher than the speed threshold V1. In other words, the controller 14 performs a control of decreasing the rotational speed of the compressor 12 only when the vehicle is idling or running at a speed lower than the speed threshold V1.

Note that the processes of steps S41 to S49 are similar to the processes of steps S31 to S39 illustrated in FIG. 6 and therefore explanation thereof will be omitted.

Then, in the fuel cell system 100 according to the fourth embodiment, the process of reducing the rotational speed of the compressor 12 is performed only when the vehicle speed Vc is lower than the speed threshold V1, and therefore the rotational speed of the compressor 12 does not decrease and a stable amount of electric power generation can be obtained while the vehicle is running in a normal state. As a result, it is possible to achieve stable running of the vehicle and also suppress the rise of oil temperature of the compressor 12 while the vehicle is idling or running at a low speed.

Explanation of Fifth Embodiment

Next, a fifth embodiment of the present invention will be described. The system configuration is similar to that of FIG. 1 described above and therefore explanation thereof will be omitted. Hereinafter, a processing procedure of the fuel cell system 100 according to the fifth embodiment will be described with reference to the flowchart illustrated in FIG. 9.

Figure 9:
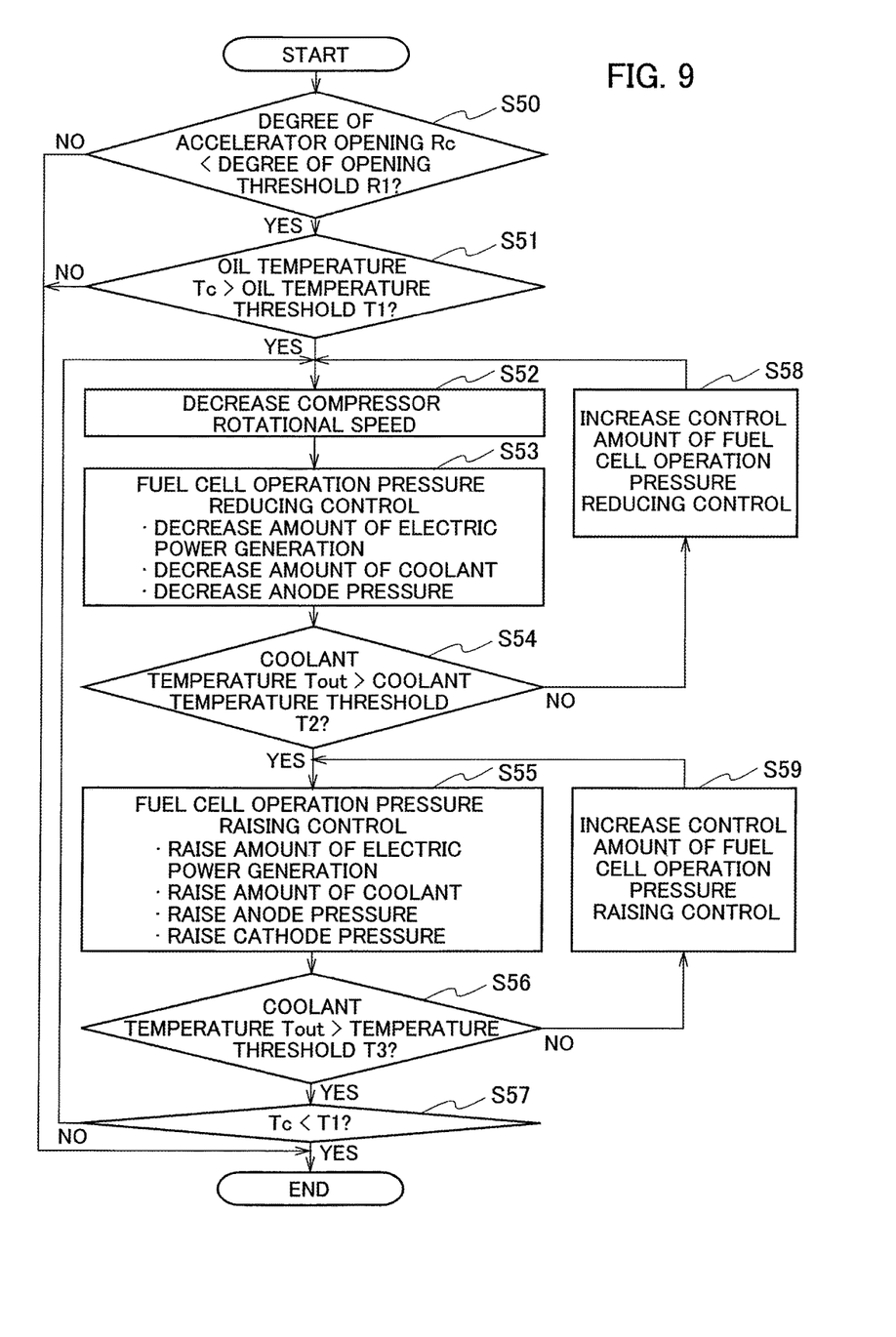
FIG. 9 is a flowchart illustrating a processing procedure of a fuel cell system according to a fifth embodiment of the present invention.

At step S50, the controller 14 obtains a degree of accelerator opening Rc of the vehicle, and compares the degree of accelerator opening Rc with a preliminarily set degree of opening threshold R1. Subsequently, the process flow proceeds to step S51 when the degree of accelerator opening Rc is lower than the degree of opening threshold R1, or the process is terminated when the degree of accelerator opening Re is equal to or higher than the degree of opening threshold R1. In other words, the controller 14 performs a control of decreasing the rotational speed of the compressor 12 only when the vehicle is running in a state with the degree of accelerator opening Rc being lower than the degree of opening threshold R1 such as when the vehicle is idling or slowing down.

Note that the processes of steps S51 to S59 are similar to the processes of steps S31 to S39 illustrated in FIG. 6 and therefore explanation thereof will be omitted.

Then, in the fuel cell system 100 according to the fifth embodiment, the process of reducing the rotational speed of the compressor 12 is performed only when the degree of accelerator opening Rc is lower than the degree of opening threshold R1, and therefore the rotational speed of the compressor 12 does not decrease and a stable amount of electric power generation can be obtained while the vehicle is running in a state with the degree of accelerator opening Rc being large such as when the vehicle is accelerating. As a result, it is possible to achieve stable running of the vehicle and also suppress the rise of oil temperature of the compressor 12 when the degree of accelerator opening Rc is small such as when the vehicle is idling or a running at a low speed.

Explanation of Sixth Embodiment

Next, a sixth embodiment of the present invention will be described. The system configuration is similar to that of FIG. 1 described above and therefore explanation thereof will be omitted. Hereinafter, a processing procedure of the fuel cell system 100 according to the sixth embodiment will be described with reference to the flowchart illustrated in FIG. 10.

Figure 10:
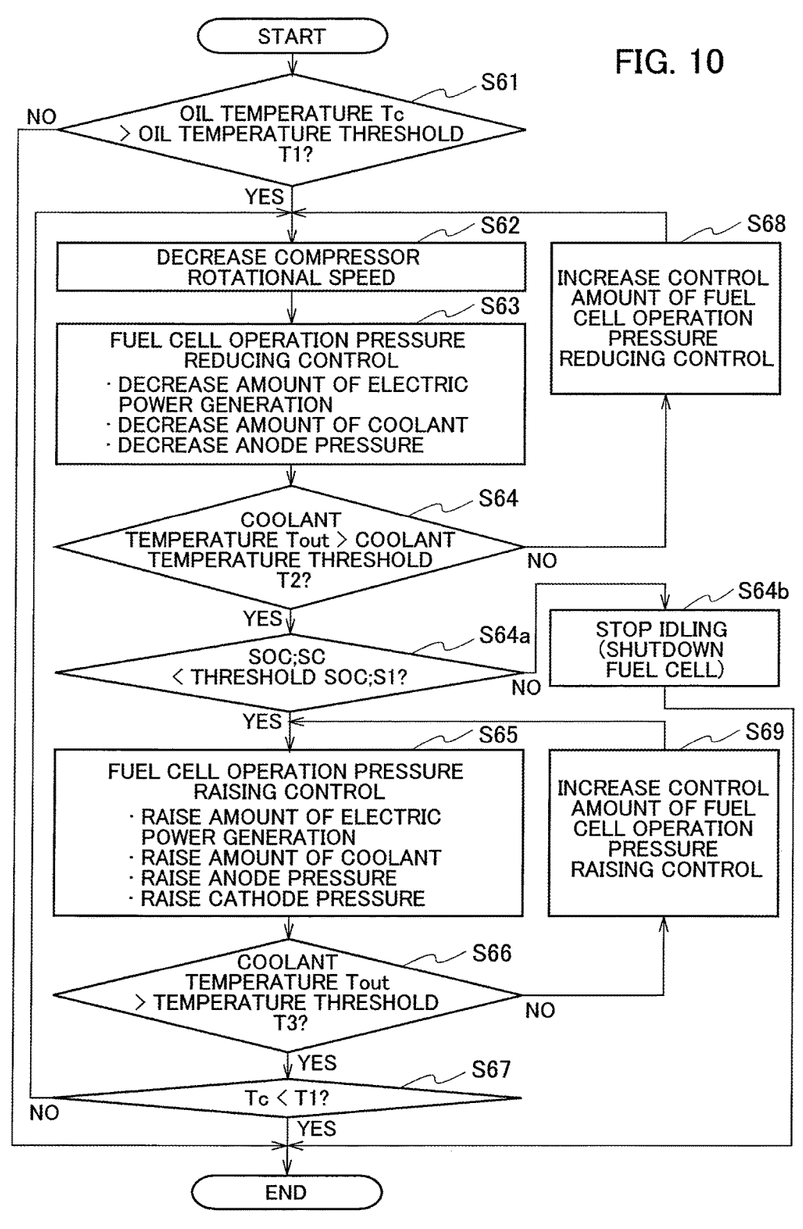
FIG. 10 is a flowchart illustrating a processing procedure of a fuel cell system according to a sixth embodiment of the present invention.

The flowchart illustrated in FIG. 10 differs from FIG. 6 illustrating the aforementioned third embodiment in that the processes of steps S64a and S64b are added. The rest of the processes are similar to the flowchart illustrated in FIG. 6. In other words, the processes of S31 to S39 illustrated in FIG. 6 are similar to the processes of S61 to S69 illustrated in FIG. 10 and therefore explanation thereof will be omitted.

Hereinafter, processes of steps S64a and S64b illustrated in FIG. 10 will be described. When it is determined at step S64 that "Tout>T2" holds, the controller 14 determines, at step S64a, whether or not the SOC (Sc) of the secondary battery 20 illustrated in FIG. 1 is lower than a preliminarily set threshold SOC (S1). In other words, the controller 14 determines whether or not "Sc<S1" holds. Subsequently, when "Sc<S1" holds (YES at step S64a), the process flow proceeds to step S65, or the process flow proceeds to step S64b when "Sc<S1" does not hold, i.e., the amount of charge is equal to or larger than the amount of charge threshold (NO at step S64a).

The process of step S65 is as described in FIG. 6. In addition, the controller 14 performs an idling stop control at step S64b. Specifically, the controller 14 performs a control of terminating the fuel cell 11.

In other words, when the coolant temperature Tout has risen and reached the coolant temperature threshold T2 by decreasing the rotational speed of the compressor 12, the controller 14 compares the SOC (Sc) with the threshold SOC (S1) and, when "Sc>S1" holds, determines that sufficient electric power is charged to the secondary battery 20 and terminates the fuel cell 11. Therefore, it is possible to prevent the oil temperature Tc of the compressor 12 from entering an overheated state. In addition, it is possible to run a vehicle using the sufficiently charged secondary battery 20 on this occasion, whereby it can be determined that terminating the fuel cell 11 does not affect the running of the vehicle.

Although a fuel cell system and a method for controlling the fuel cell system of the present invention has been described above on the basis of the illustrated embodiments, the present invention is not limited to those, and the configuration of each unit can be replaced with any configuration having a similar function.

REFERENCE SIGNS LIST 11 fuel cell
11a anode
11b cathode
12 compressor
13 hydrogen tank
14 controller
15 radiator
16 coolant flow path
17 coolant pump
18 hydrogen circulation pump
19 power manager
20 secondary battery
21 motor
22 hydrogen supply valve
23 air pressure adjustment valve
24 purge valve
25 coolant temperature sensor
26 cathode pressure sensor
27 anode pressure sensor
28 radiator fan
29 oil temperature sensor
100 fuel cell system

The invention claimed is:

1. A fuel cell system comprising:
a fuel cell mounted on a vehicle to generate electric power using oxidation gas and fuel gas being supplied thereto;
an oil temperature detector configured to detect oil temperature of a compressor supplying the oxidation gas; and
a controller configured to control driving of the compressor, and also control pressure of the oxidation gas and pressure of the fuel gas being supplied to the fuel cell, wherein
the controller performs a control of decreasing rotational speed of the compressor when the oil temperature has exceeded an oil temperature threshold, and further performs a control of balancing the pressure of the oxidation gas and the pressure of the fuel gas.

2. The fuel cell system according to claim 1 comprising a coolant temperature detector configured to detect coolant temperature of the fuel cell, wherein
the controller decreases the pressure of the oxidation gas and the pressure of the fuel gas by decreasing the rotational speed of the compressor,
the controller decreases coolant pressure by decreasing the pressure of the oxidation gas and the pressure of the fuel gas, and
during the coolant temperature rises due to decreasing the coolant pressure, the controller keeps decreasing the rotational speed of the compressor until the coolant temperature rises to a coolant temperature threshold.

3. The fuel cell system according to claim 1 comprising a coolant temperature detector configured to detect coolant temperature of the fuel cell, wherein
the controller performs a control of increasing the rotational speed of the compressor and balancing pressure of the oxidation gas and pressure of the fuel gas, when the coolant temperature has exceeded the coolant temperature threshold.

4. The fuel cell system according to claim 1, wherein
the controller obtains running speed of the vehicle and, when the running speed is lower than a preliminarily set speed threshold, performs a control of decreasing the rotational speed of the compressor.

5. The fuel cell system according to claim 1, wherein
the controller obtains information on degree of accelerator opening of a vehicle and, when the degree of accelerator opening is lower than a preliminarily set degree of opening threshold, performs a control of decreasing the rotational speed of the compressor.

6. The fuel cell system according to claim 1 comprising a coolant temperature detector configured to detect coolant temperature of the fuel cell, wherein
the controller obtains an amount of charge of a secondary battery mounted on a vehicle and, when the coolant temperature has exceeded the coolant temperature threshold, terminates the operation of the fuel cell in a case where the amount of charge of the secondary battery is equal to or larger than a preliminarily set amount of charge threshold.

7. A method for controlling a fuel cell system comprising a fuel cell configured to generate electric power using oxidation gas and fuel gas being supplied thereto, the method comprising the steps of:
detecting oil temperature of a compressor supplying oxidation gas to the fuel cell;
decreasing rotational speed of the compressor when the oil temperature has exceeded an oil temperature threshold; and
performing a control of balancing the pressure of the oxidation gas and the pressure of the fuel gas when decreasing the rotational speed of the compressor.

* * * * *